(12) United States Patent
Ogawa

(10) Patent No.: US 7,112,802 B2
(45) Date of Patent: Sep. 26, 2006

(54) SCINTILLATOR PANEL, RADIATION DETECTING APPARATUS, AND RADIATION DETECTION SYSTEM

(75) Inventor: Yoshihiro Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 255 days.

(21) Appl. No.: 10/812,919

(22) Filed: Mar. 31, 2004

(65) Prior Publication Data

US 2004/0200973 A1    Oct. 14, 2004

(30) Foreign Application Priority Data

Apr. 11, 2003   (JP)   ............................. 2003-107946

(51) Int. Cl.
*G01T 1/20*   (2006.01)

(52) U.S. Cl. .................................. 250/370.11

(58) Field of Classification Search ............ 250/370.11
See application file for complete search history.

(56) References Cited

U.S. PATENT DOCUMENTS

| | | | |
|---|---|---|---|
| 4,803,366 A | 2/1989 | Vieux et al. ............. | 250/486.1 |
| 5,185,772 A | 2/1993 | Shirouzu et al. ............... | 378/29 |
| 6,172,371 B1 * | 1/2001 | DeJule et al. ........... | 250/370.11 |
| 6,379,784 B1 * | 4/2002 | Yamamoto et al. ......... | 428/216 |
| 6,469,305 B1 | 10/2002 | Takabayashi et al. ....... | 250/361 |
| 6,835,936 B1 | 12/2004 | Okada et al. .......... | 250/370.11 |
| 6,847,041 B1 | 1/2005 | Okada et al. .......... | 250/370.11 |
| 2002/0017613 A1* | 2/2002 | Homme et al. ........ | 250/370.11 |

FOREIGN PATENT DOCUMENTS

| | | |
|---|---|---|
| JP | 62-073538 | 4/1987 |
| JP | 63-216000 | 9/1988 |
| JP | 05-031101 | 2/1993 |
| JP | 2003287571 A * | 10/2003 |

* cited by examiner

*Primary Examiner*—David Porta
*Assistant Examiner*—Christopher Webb
(74) *Attorney, Agent, or Firm*—Fitzpatrick, Cella, Harper & Scinto (57) ABSTRACT

To provide a scintillator panel in which uniform photoelectric converting efficiency is obtained and an image of a high sensitivity and a high sharpness is obtained, a scintillator panel has: a phosphor layer for converting a radiation into light; and a supporting member having a supporting substrate having radiation permeability for supporting the phosphor layer, wherein the supporting substrate is formed by laminating non-conductive layers for assuring non-conductivity of a surface which supports the phosphor layer of the supporting substrate and non-conductivity of an opposite surface which faces the surface and a rigidity holding layer for assuring rigidity of the supporting substrate. Further, moisture-proof metal foils are laminated onto the surface and the opposite surface of the supporting substrate. The panel further includes a moisture resistant protective layer which covers the phosphor layer and the supporting member.

9 Claims, 5 Drawing Sheets

SCINTILLATOR PANEL, RADIATION DETECTING APPARATUS, AND RADIATION DETECTION SYSTEM

BACKGROUND OF THE INVENTION

1. Field of the Invention

The invention relates to a scintillator panel. Further, the invention relates to a scintillator panel for a radiation detecting apparatus which is used for a medical diagnosing apparatus, a non-destructive inspecting apparatus, or the like and, more particularly, to a scintillator panel for a radiation detecting apparatus which is used for X-ray photographing or the like. In the specification, explanation will be made on the assumption that electromagnetic waves such as X-ray, α-ray, β-ray, γ-ray, and the like are also included in the radiation.

2. Related Background Art

Hitherto, an X-ray film system having a fluorescent screen having an X-ray phosphor therein and a duplicated sensitive agent has generally been used for photographing an X-ray picture. However, in recent years, a digital radiation detecting apparatus having an X-ray phosphor layer and a 2-dimensional photodetector has advantages that image characteristics are excellent and, since data is digital data, by fetching the data into a computer system connected to a network, the data can be shared. Therefore, research and development have vigorously been made with respect to the digital radiation detecting apparatus and various patent applications have also been filed.

As a digital radiation detecting apparatus, a scintillator panel for a radiation detecting apparatus constructed in such a manner that a reflective layer and a protective layer of a thin metal film are formed on a supporting substrate which transmits a radiation and, further, a phosphor layer is formed on the protective layer has been disclosed in U.S. Pat. No. 2002/0017613 A1. By providing the protective layer between the phosphor layer and the reflective layer in the scintillator panel, it is prevented that a function as a reflective film of the reflective layer is attenuated due to alteration or the like by components and moisture contained in the phosphor layer.

A columnar (needle) crystal of alkali halide is used as a scintillator material used in the above prior art. Further, a few % metal such as Tb, Eu, or the like is uniformly contained into alkali halide as a light emission activator. A vacuum evaporation depositing method is used for forming the columnar crystal. In order to simultaneously evaporation-deposit alkali halide and the light emission activator and, further, make the most of an effect of the light emission activator, the columnar crystal is left in an atmosphere of 200 to 260° C.

Figure 7:
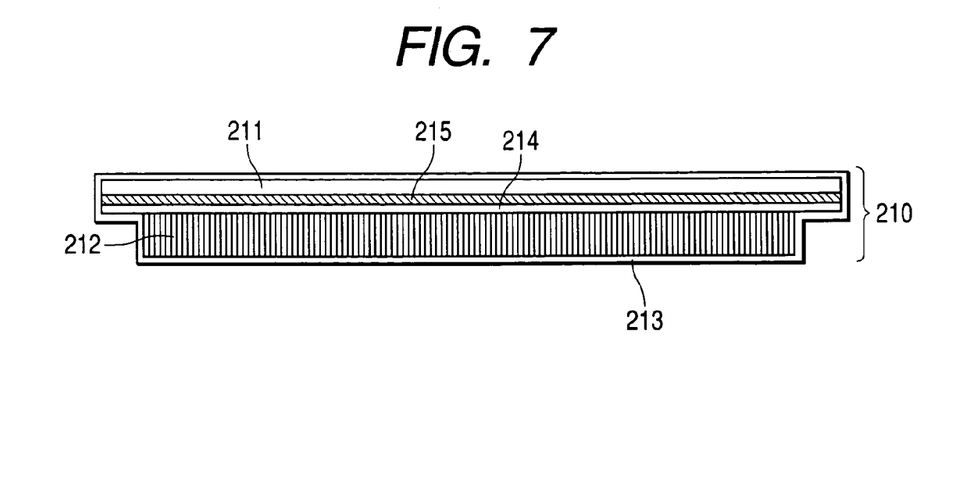
FIG. 7 is a cross sectional view showing a construction of an embodiment of a phosphor supporting substrate in a conventional scintillator panel.
Figure 8A:
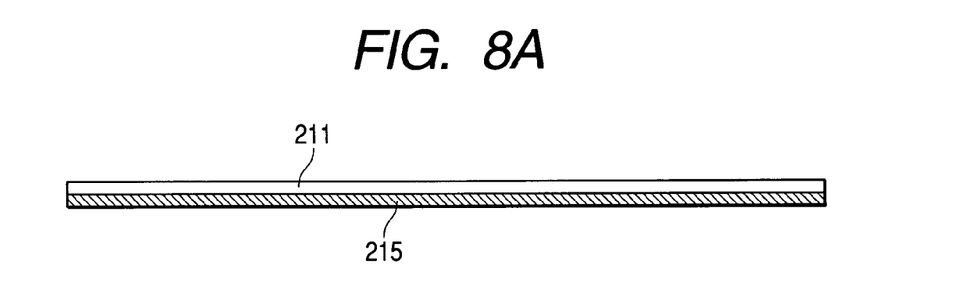
FIG. 8A is a cross sectional view showing a manufacturing method of the embodiment of the phosphor supporting substrate in the conventional scintillator panel.
Figure 8B:
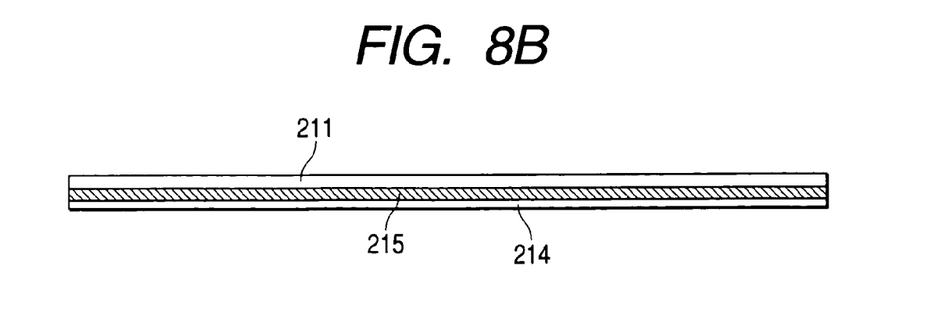
FIG. 8B is a cross sectional view showing a manufacturing method of the embodiment of the phosphor supporting substrate in the conventional scintillator panel.

Examples of a scintillator panel disclosed in U.S. Pat. No. 2002/0162965 AA are shown in FIGS. 7, 8A, and 8B. Only an insulative layer 215 is formed on a supporting substrate 211 (FIG. 7) or the insulative layer 215 is formed thereon and a metal reflective layer 214 is formed on the insulative layer 215 (FIG. 8B).

In a scintillator panel 210 for the radiation detecting apparatus disclosed in the prior art mentioned above, a conductive substrate such as amorphous carbon substrate, metal substrate like an aluminum substrate, or the like is used as a supporting substrate 211. Particularly, the reasons why the amorphous carbon substrate is used as a supporting substrate 211 are as follows.

1. Since an absorption amount of X-ray of the amorphous carbon substrate is smaller than that of a glass substrate or an aluminum substrate, a larger amount of X-ray can be transmitted into the phosphor layer. 2. Chemical resistance is excellent. 3. Heat resistance is excellent.

SUMMARY OF THE INVENTION

However, since the conductive substrate such as amorphous carbon substrate, metal substrate, or the like is made of a conductive material, for example, if the phosphor layer made of alkali halide is formed on the metal reflective layer 214 made of aluminum or the like by using the amorphous carbon substrate, there is a case where the metal reflective layer 214 is altered due to electrochemical corrosion and reflecting characteristics are attenuated.

When the metal reflective layer is formed on one surface of the supporting substrate made of the amorphous carbon substrate as disclosed in U.S. Pat. No. 2002/0162965 AA, a warp occurs in the supporting substrate. When the phosphor layer of the cylindrical crystal is evaporation-deposited onto the warped substrate, since it is difficult to handle the supporting substrate in the case of setting the supporting substrate into an evaporation depositing apparatus and a defect occurs easily in the phosphor layer, there is a case where production efficiency deteriorates.

If an insulative layer is formed between the surface of the amorphous carbon substrate and the metal reflective layer as shown in the above prior art, it takes a time to form the insulative layer and costs rise. Moreover, if a material of the insulative layer differs from that of the substrate, there is a problem that deformation is caused in dependence on a forming process. Further, since a defect in adhesion between the insulative layer and the substrate occurs, it is difficult to select the materials.

It is, therefore, an object of the invention to provide a scintillator panel in which a phosphor layer, particularly, a phosphor layer of columnar crystal can be easily formed, uniform photoelectric conversion efficiency is obtained, and an image of high sensitivity and high sharpness can be provided.

Another object of the invention is to provide a high-durability scintillator panel for a radiation detecting apparatus.

Further another object of the invention is to provide a low-cost scintillator panel for a radiation detecting apparatus.

According to the invention, there is provided a scintillator panel comprising: a phosphor layer for converting a radiation into light; and a supporting member having a supporting substrate having radiation transmittable for supporting the phosphor layer, wherein the supporting substrate is formed by laminating non-conductive layers for assuring non-conductivity of a surface which supports the phosphor layer of the supporting substrate and non-conductivity of an opposite surface which faces the surface and a rigidity holding layer for assuring rigidity of the supporting substrate.

Preferred embodiments are shown below.

The supporting member is formed by further laminating moisture-proof metal foils onto the surface and the opposite surface of the supporting substrate.

The rigidity holding layer is made of a resin which holds the rigidity and the non-conductive layer is formed by a precursor of a resin which holds the rigidity.

The resin is made of an aromatic polyimide resin and the precursor is made of an aromatic polyimide precursor.

A thickness of the moisture-proof metal foil lies within a range from 10 to 100 μm.

The supporting member is formed by laminating a plurality of non-conductive layers and a plurality of rigidity holding layers.

The scintillator panel further includes a moisture prevention protective layer which covers the phosphor layer and the supporting member.

A radiation detecting apparatus according to the invention has: the scintillator panel mentioned above; and a sensor panel including a plurality of photoelectric converting elements which are two-dimensionally arranged and convert the light converted in the phosphor layer into electric signals.

A radiation detection system of the invention has the radiation detecting apparatus disclosed above.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS (Embodiments)

The invention will be described in detail hereinbelow with reference to the drawings.

Figure 1:
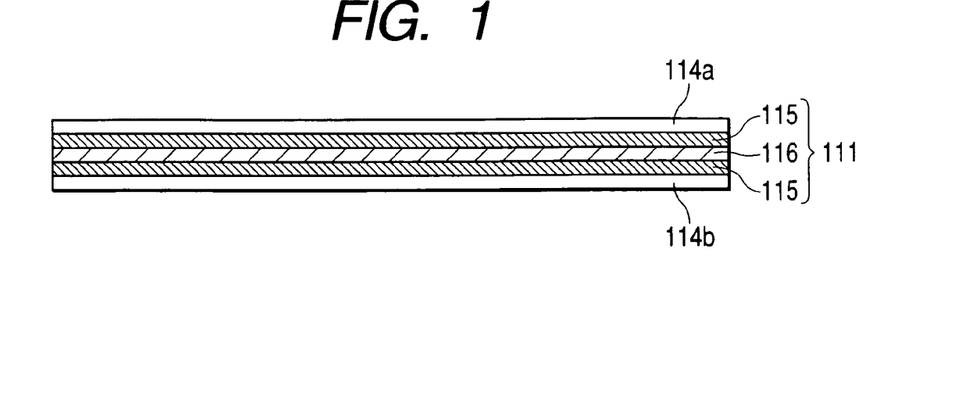
FIG. 1 is a cross sectional view showing a construction of an embodiment of a phosphor supporting substrate in a scintillator panel of the invention.
Figure 2:
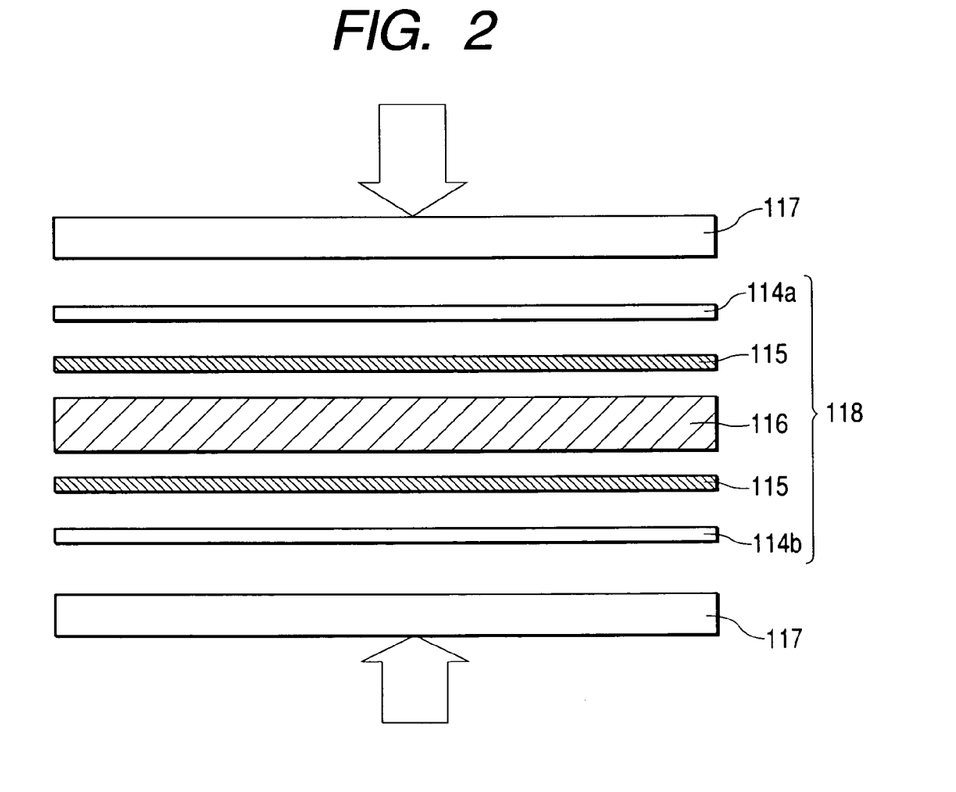
FIG. 2 is a cross sectional view showing a manufacturing method of the embodiment of the phosphor supporting substrate in the scintillator panel of the invention.

FIG. 1 is a cross sectional view showing an embodiment of a supporting substrate in a scintillator panel of the invention. FIG. 2 is a diagram showing a manufacturing method of the supporting substrate in the scintillator panel of the invention.

Reference numeral 111 denotes a supporting substrate; 114a and 114b moisture-proof metal foils; 115 non-conductive layers; and 116 a rigidity holding layer. In the supporting substrate 111, the rigidity holding layer 116 is sandwiched by the two non-conductive layers 115 and both surfaces of the supporting substrate 111 are substantially non-conductive layers. The rigidity holding layer 116 can be a laminate in a state where it is completely separated like layers or can be also constructed in such a manner that a rigidity holding member exists in the non-conductive layers without a distinct boundary and the rigidity holding layer is formed.

The rigidity holding layer 116 is a member which substantially assures rigidity of the supporting substrate 111 and by providing the non-conductive layers 115 onto both surfaces of the rigidity holding layer 116, it is possible to form the supporting substrate 111 in which one surface that has rigidity and supports a phosphor layer and the other surface which faces such a surface are substantially non-conductive. By providing the moisture-proof metal foils 114a and 114b onto both surfaces of the supporting substrate 111, moisture resistance of the supporting substrate 111 can be assured and a function as a reflective layer for reflecting the light obtained by converting the radiation in the phosphor layer or reflecting the external light and a function as a magnetic shield for shielding an electromagnetic wave from the outside can be assured. In a manufacturing step of the scintillator, since the moisture-proof metal foils 114a and 114b are provided, a force acts uniformly via press molding substrates 117 upon pressing and a supporting member 118 can be preferably manufactured.

In the embodiment, in a cross section of the supporting member 118, since the non-conductive layers 115 and the moisture-proof metal foils 114a and 114b are symmetrically formed around the rigidity holding layer 116 as a center, the supporting member 118 has no warp, the supporting member 118 can be easily set into an evaporation depositing apparatus when the phosphor layer of a columnar crystal is evaporation deposited to the supporting member 118, the number of defects which are caused in the phosphor layer is reduced, and the productivity can be improved.

Figure 3:
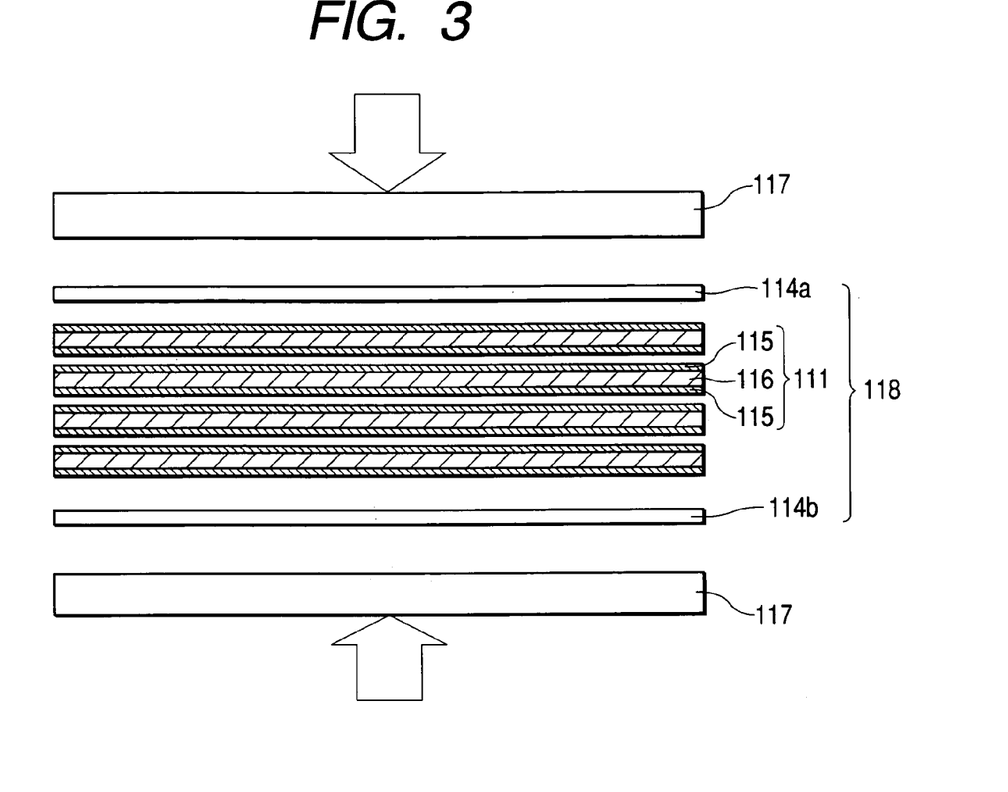
FIG. 3 is a cross sectional view showing another manufacturing method of the embodiment of the phosphor supporting substrate in the scintillator panel of the invention.

FIG. 3 is a diagram showing a manufacturing method of another embodiment of the supporting substrate in the scintillator panel of the invention. In FIG. 3, the supporting substrate 111 is formed by laminating a plurality of non-conductive layers 115 and a plurality of rigidity holding layers 116. As shown in FIG. 3, the non-conductive layers 115 are substantially formed on both outermost surfaces of the supporting substrate 111 and the supporting member 118 as a supporting substrate 111 with the moisture-proof metal foils 114a and 114b is formed by batch press molding by the press substrates so that the moisture-proof metal foils 114a and 114b having characteristics as reflective layers are laminated so as to be come into contact with the non-conductive layers 115. Although the moisture-proof metal foils 114a and 114b are formed on both surfaces of the supporting substrate 111, the moisture-proof metal foil 114a provided on the side where no phosphor layer is formed is used as a moisture-proof-layer to assure the moisture resistance of the supporting substrate 111. The foil 114a can be also used as a reflective layer for preventing the external light from entering a sensor and, further, as a magnetic shield for shielding the electromagnetic wave from the outside by setting an electric potential of the foil 114a to a predetermined potential. Therefore, as a moisture-proof metal foil 114a, the foil having no pin hole is particularly desirable. The moisture-proof metal foil 114b having a function as a moisture-proof layer to assure the moisture resistance of each of the supporting substrate 111 and the phosphor layer and a function as a reflective layer to reflect the light which is emitted from the phosphor layer that converts the radiation upon irradiation is formed on the surface side of the supporting substrate 111 where the phosphor layer is provided. Therefore, in order to allow the moisture-proof metal foil 114b to function as a reflective layer, it is desirable that the foil 114b is a metal surface having a high reflectance and a high mirror surfaceness so as to efficiently reflect the light which is emitted from the phosphor layer that converts the radiation upon irradiation.

In a manufacturing method of the supporting substrate of the invention, the supporting substrate 111 is molded by pressing the laminated structure in which the rigidity holding layer 116 is sandwiched by the non-conductive layers 115 and, further, the surfaces of the supporting substrate 111 are sandwiched by the moisture-proof metal foils 114a and 114b. Therefore, surface properties of the moisture-proof metal foils 114a and 114b reflect the properties of the surface which is in contact upon pressing. Generally, the surface of the press molding substrates 117 of a pressing machine or a peeling film is come into contact with the substrate to be pressed upon pressing. Therefore, a surface whose properties are similar to desired surface properties of the moisture-proof metal foils 114a and 114b is formed on the surface of the press molding substrates 117 of the pressing machine or at least one surface of the peeling film (not shown).

Figure 4:
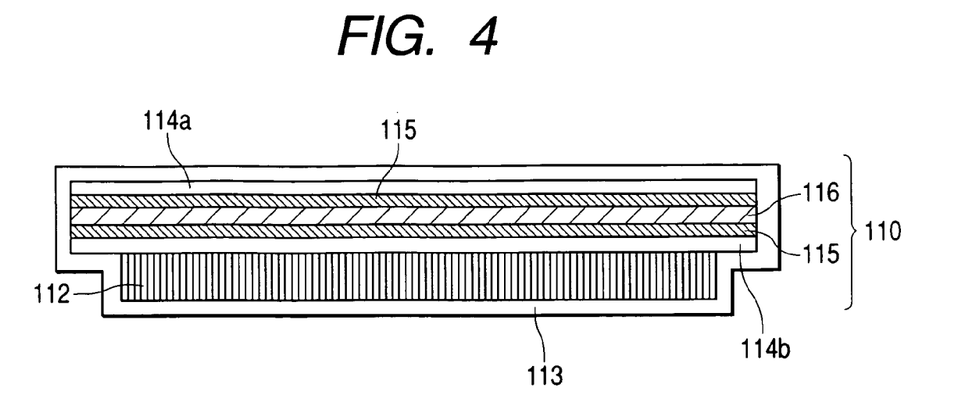
FIG. 4 is a cross sectional view showing a construction of an embodiment of the scintillator panel of the invention.

FIG. 4 is a cross sectional view showing the scintillator panel of an embodiment of the invention. Reference numeral 112 denotes a column-shaped crystallized phosphor layer made of alkali halide and 113 indicates a moisture resistant protective layer to assure moisture resistance of the phosphor layer 112. A material made of alkali halide and a light emission activator is evaporation deposited under a condition of 25 to 150° C. onto the moisture-proof metal foil 114b of the supporting member 118 in which the moisture-proof metal foils 114a and 114b are formed on both surfaces of the supporting substrate 111 comprising the rigidity holding layer 116 and the non-conductive layers 115 formed on both surfaces of the rigidity holding layer 116. The phosphor layer 112 made of the columnar crystal is molded. Further, the phosphor layer 112 is formed by thermally processing them at temperatures of 200 to 260° C. in order to improve the efficiency of the light emission activator. After the phosphor layer 112 is formed, the whole surface is coated with the moisture resistant protective layer 113, so that a scintillator panel 110 for a radiation detecting apparatus is completed.

Figure 5:
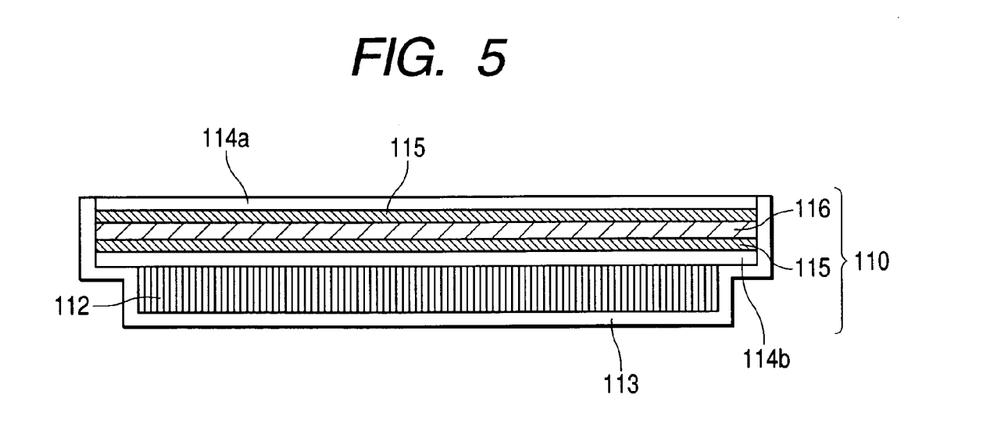
FIG. 5 is a cross sectional view showing a construction of another embodiment of the scintillator panel of the invention.

FIG. 5 is a cross sectional view showing a scintillator panel of another embodiment of the invention. Since a construction other than the moisture resistant protective layer 113 and forming steps of the scintillator panel of this embodiment are similar to those of the scintillator panel shown in FIG. 4, their description is omitted here. In the scintillator panel of this embodiment, after the phosphor layer 112 is formed, the top face and the side surfaces of the phosphor layer 112 and the surfaces and the edge surfaces other than the region where the phosphor layer 112 is formed on the side of the supporting member 118 where the phosphor layer 112 is formed excluding the moisture-proof metal foil 114a on which the phosphor layer 112 is not formed are coated with the moisture resistant protective layer 113, so that the scintillator panel 110 for the radiation detecting apparatus is completed. The moisture resistant protective layer 113 is provided at the edge surfaces of the supporting member 118 so as to cover at least interfaces between the rigidity holding layer 116 and the non-conductive layers 115 and interfaces between the non-conductive layers 115 and the moisture-proof metal foils 114a and 114b. By providing the moisture resistant protective layer 113 as mentioned above, effects that the moisture resistance of the phosphor layer 112 is assured and the strength and the moisture resistance of each of the supporting substrate 111 and the supporting member 118 are improved are obtained.

Generally, a moisture permeability of each of the moisture-proof metal foils 114a and 114b is smaller than that of a layer made of an organic material. For example, in the case of an organic film made of polyparaxylylene as a typical organic moisture-proof film, its moisture permeability is equal to 30 g/m$^2$·24 h. In the case of an epoxy film as a general resin film, its moisture permeability is equal to 250 g/m$^2$·24 h. However, the moisture permeability of the moisture-proof metal layer is equal to or less than 0.1 g/m$^2$·24 h (25 µm) and a moisture resistant effect which is derived by forming the moisture-proof metal layer is large. Therefore, the moisture-proof metal foil 114a has already been provided on the side where no phosphor layer is formed and if the moisture resistant effect to the supporting substrate 111 is sufficient, there is no need to further provide the moisture resistant protective layer 113 onto the moisture-proof metal foil 114a.

Figure 6:
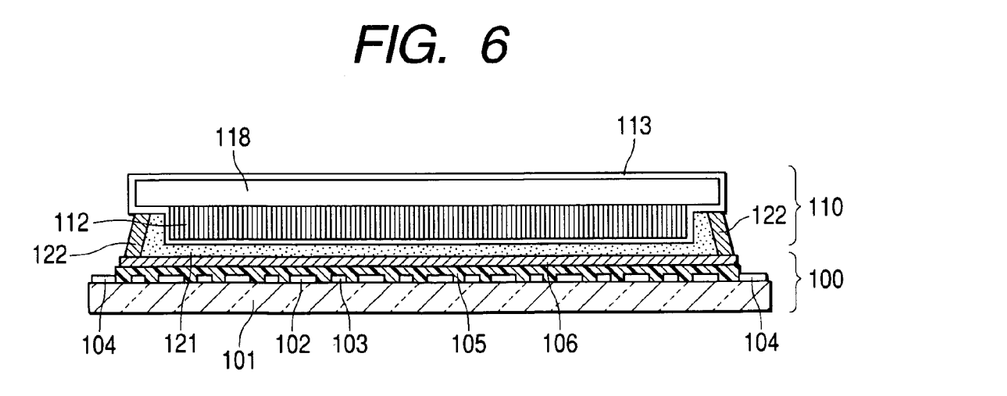
FIG. 6 is a cross sectional view showing a construction of an embodiment of a radiation detecting apparatus using the scintillator panel of the invention.

FIG. 6 is a cross sectional view of a radiation detecting apparatus obtained by adhering the foregoing scintillator panel to a 2-dimensional photodetector comprising a plurality of photoelectric converting elements and a gap between the photoelectric converting elements on each of which an electric element such as a TFT or the like, wirings, and the like are arranged. In FIG. 6, reference numeral 101 denotes a glass substrate; 102 a photoelectric converting element portion comprising a photoelectric converting element (photosensor) made of amorphous silicon and a TFT; 103 a wiring portion; 104 an electrode extracting portion; 105 a first protective layer made of silicon nitride or the like; and 106 a second protective layer made of polyimide or the like. Reference numeral 118 denotes the supporting member comprising the supporting substrate 111 provided with the moisture-proof metal foils 114a and 114b; 112 the phosphor layer made of a phosphor of the columnar crystal; and 113 the moisture resistant protective layer made of an organic resin or the like. A 2-dimensional photodetector 100 is constructed by the component elements 101 to 106 and the scintillator panel 110 is constructed by the component elements 112, 113, and 118. Reference numeral 121 denotes an adhesive layer made of a transparent adhesive agent and 122 indicates a sealing portion. The radiation detecting apparatus is obtained by adhering the photodetector 100 and the scintillator panel 110 via the adhesive layer 121 as mentioned above.

It is desirable that the rigidity holding layer 116 in the invention is made of a material in which X-ray transmittance is high and heat resistance is high and which has rigidity capable of holding the rigidity of the supporting substrate 111. As a preferred materials, there can be mentioned a resin which holds the rigidity such as polyimide resin, polyether imide resin, polyamide resin, polyacrylate resin, polyether sulfone resin, polysulfone resin, polyphenylene sulfide resin, polyether etherketone resin, fluororesin, polyether nitrile resin, bismaleinimide resin, or the like. Particularly, an aromatic polyimide resin having excellent heat resistance is preferable. The rigidity holding layer 116 can be made of either a material having conductivity or a material having non-conductivity.

As a non-conductive resin which is used for the non-conductive layers 115 in the invention, it is desirable that they are made of a non-conductive material having excellent adhesion to the rigidity holding layer 116 and the moisture-proof metal foils 114a and 114b. As such a material, it is desirable to use a precursor of the resin which holds the rigidity. Particularly, when the rigidity holding layer 116 is made of the aromatic polyimide resin, it is preferable that the non-conductive resin is made of an aromatic polyimide precursor. Since the rigidity of the supporting substrate 111 is improved and the adhesion between the layers is improved by using the foregoing material, durability of the supporting substrate 111 is improved. After the rigidity holding layer 116 made of the foregoing preferable material, the non-conductive layers 115 made of the foregoing preferable material, and the moisture-proof metal foils 114a and 114b are laminated, they are integratedly laminated by bonding with a pressure and heat, so that the supporting member 118 to which the moisture-proof metal foils 114a and 114b are laminated is obtained. In the invention, a part of the aromatic polyimide precursor can be converted into imide and it is obtained by polymerizing an aromatic diamine component and an aromatic tetracarvone component in an organic polarity solvent at a rate of preferably an almost equal mole. Such an aromatic polyimide precursor itself can be manufactured by a well-known method.

As a foregoing aromatic diamine component, for example, there can be mentioned: benzenoid diamine such as 1,4-diaminobenzene(p-phenylenediamine), 1,3-diaminobenzene, 1,2-diaminobenzene, or the like; diphenyl (thio) ether diamine such as 4,4'-diamino diphenylether, 3,4'-diamino diphenylether, 3,3'-diamino diphenylether, 4,4'-diamino diphenylthioether, or the like; benzophenone diamine such as 3,3'-diamino benzophenone, 4,4'-diamino benzophenone, or the like; diphenylphosphine diamine such as 3,3'-diamino diphenylphosphine, 4,4'-diamino diphenylphosphine, or the like; diphenyl alkylene diamine such as 3,3'-diamino diphenylmethane, 4,4'-diamino diphenylmethane, 3,3'-diamino diphenylpropane, 4,4'-diamino diphenylpropane, or the like; diphenylsulfide diamine such as 3,3'-diamino diphenylsulfide, 4,4'-diamino diphenylsulfide, or the like; diphenylsulfone diamine such as 3,3'-diamino diphenylsulfone, 4,4'-diamino diphenylsulfone, or the like; a benzidine class such as benzidine, 3,3'-dimethyl benzidine, or the like; bis(aminophenoxy) benzenoid diamine such as 1,3-bis(3-aminophenoxy) benzene or the like; bis(aminophenoxy) biphenyl diamine such as 4,4'-bis(3-aminophenoxy) biphenyl or the like; bis((aminophenoxy) phenyl) sulfone such as bis ((4-aminophenoxy) phenyl)sulfone or the like; or the like. One of them can be solely used or a mixture of them can be used.

As an aromatic diamine component, it is particularly preferable to use phenylenediamine such as 1,4-diaminobenzene(p-phenylenediamine) or the like solely or a mixture of 50 mol % or more of phenylenediamine and 4,4'-diamino diphenylether.

As an aromatic tetracarboxylic acid component, aromatic tetracarboxylic acid and its acid anhydride, salt, ester, or the like can be mentioned. Particularly, acid anhydride is preferable. As aromatic tetracarboxylic acid, for example, there can be mentioned: 3,3',4,4'-biphenyl tetracarboxylic acid; 2,3',3,4'-bipheny tetracarboxylic acid; pyromellitic acid; 3,3',4,4'-benzophenone tetracarboxylic acid; 2,2-bis(3,4-dicarboxyphenyl) propane; bis(3,4-dicarboxyphenyl)methane; bis(3,4-dicarboxyphenyl) ether; bis(3,4-dicarboxyphenyl) thioether; bis(3,4-dicarboxyphenyl) phosphine; bis (3,4-dicarboxyphenyl)sulfone; or the like.

As a material of the moisture-proof metal foils 114a and 114b in the invention, an arbitrary material can be used so long as it is a metal which can be formed as foils of Al, Ag, Cr, Cu, Ni, Ti, Mg, Rh, Pt, Au, and the like. Particularly, it is desirable to use a metal having high reflectance to the light of a wavelength which is converted by the phosphor layer. It is preferable that a thickness of each of the moisture-proof metal foils 114a and 114b in the invention lies within a range from 10 to 100 µm. If the thickness is equal to or less than 10 µm, it is difficult to assure the rigidity and the moisture proof. If the thickness is equal to or larger than 100 µm, the sufficient radiation transmittable cannot be obtained.

As a moisture resistant protective layer 113 which covers the supporting member 118 and the phosphor layer 112 in the invention, an arbitrary material provided for the purpose of protecting the moisture proof of the phosphor layer 112 can be used so long as such a purpose is accomplished. Particularly, if a column-shaped crystallized phosphor layer made of alkali halide having a deliquescence property is used as a phosphor layer 112, it is desirable to use the organic film made of polyparaxylylene formed by the CVD method disclosed in U.S. Pat. No. 6,469,305, the organic film formed by the plasma polymerizing method, or the like.

As a phosphor layer 112 in the invention, an arbitrary material of the phosphor can be used so long as it emits visible light when it receives a radiation. Particularly, as a material of the phosphor having a columnar crystal structure made of alkali halide, it is preferable to use a material containing alkali halide as a main component, for example, CsI:Tl, CsI;Na, CsBr:Tl, or the like.

Figure 9:
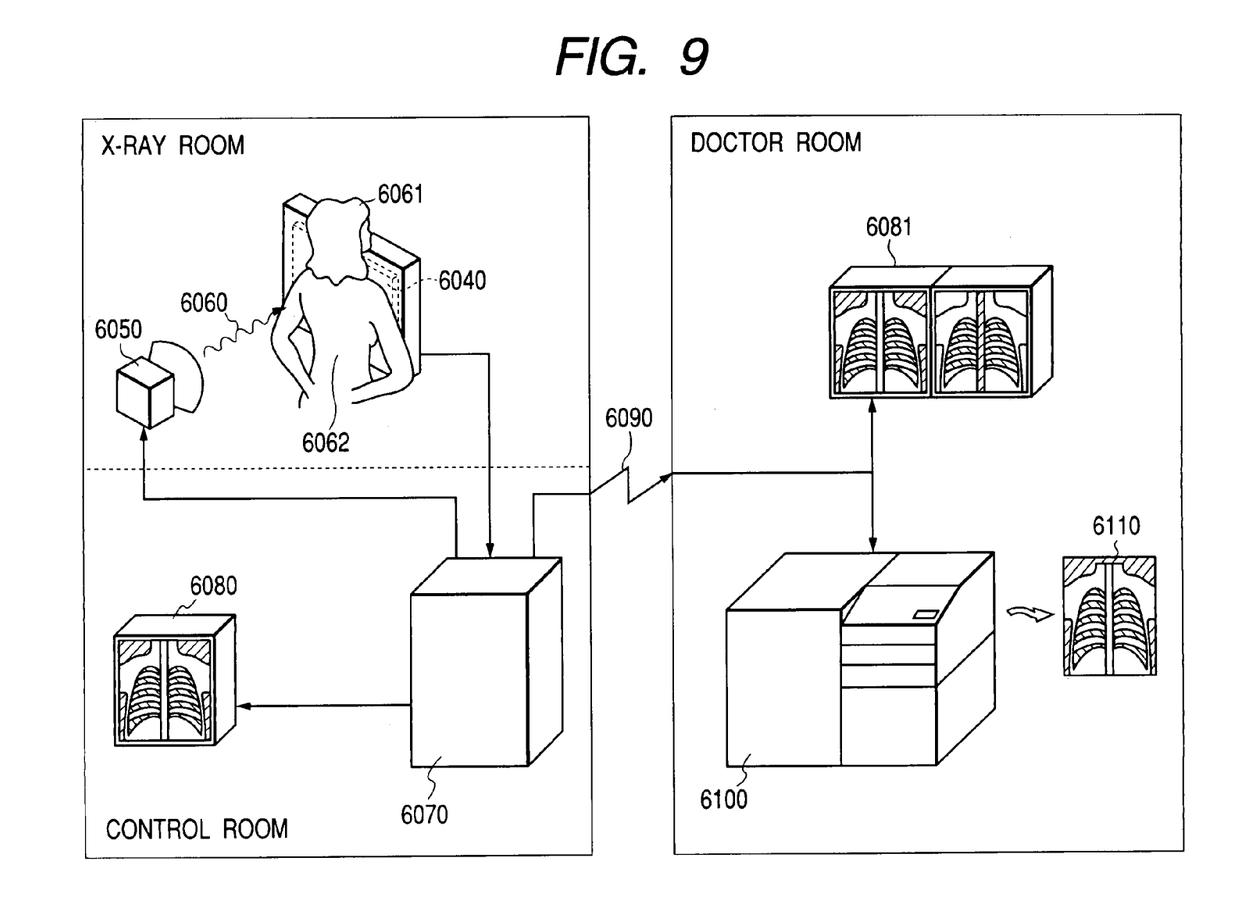
FIG. 9 is a diagram showing a system using the scintillator panel of the invention.

FIG. 9 is a conceptual diagram showing a radiation detection system using the radiation detecting apparatus of the invention.

An X-ray 6060 generated by an X-ray tube 6050 transmits a chest 6062 of a patient or subject 6061 and enters a radiation detecting apparatus 6040 as shown in FIG. 6. Information of the internal body of the patient 6061 is included in the incident X-ray. The scintillator (phosphor layer) emits light in correspondence to the incidence of the X-ray. A photoelectric converting element of a sensor panel photoelectrically converts the emitted light, so that electrical information is obtained. The information is converted into a digital signal and image-processed by an image processor 6070 serving as signal processing means and a resultant image can be observed by a display 6080 serving as display means in a control room.

The information can be transferred to a remote place by transmission processing means such as a telephone line 6090 or the like. The information can be displayed on a display 6081 serving as display means in a doctor room or the like at a different place or can be stored into recording means such as an optical disk or the like. Doctors at remote places can also diagnose on the basis of the recorded information. The information can be also recorded onto a film 6110 by a film processor 6100 serving as recording means.

The invention can be applied to the medical X-ray sensor as described above. The invention is also effective in the case where it is, applied to other fields such as non-destructive inspection and the like.

EXAMPLES

The radiation detecting apparatus in the invention will now be described in detail on the basis of Examples.

Example 1

As shown in FIG. 6, the photodetecting portions (pixel portions) 102 are formed onto the glass substrate 101 by thin semiconductor films made of amorphous silicon. A first protective layer 105 made of SiNx and, further, a polyimide resin are spin-coated onto them and hardened at 200° C. for 6 hours and a second protective layer 106 is formed, thereby manufacturing the photodetector 100.

Subsequently, aromatic polyimide precursors having a thickness of 5 µm and serving as non-conductive layers 115 are coated onto both surfaces of an aromatic polyimide resin having a thickness of 0.5 mm and serving as a rigidity holding layer 116. Aluminum foils having a thickness of 20 µm and serving as moisture-proof metal foils 114a and 114b are laminated onto the surfaces of the aromatic polyimide precursors, pressed, and thereafter, pressed with heat at 270° C., thereby molding the supporting member 118. Upon molding of the supporting member 118, the supporting member 118 is molded by using a vacuum pressure hot pressing machine. A surface roughness (arithmetic mean height) Ra of the pressing surface in the press molding substrates 117 of the pressing machine is set to 0.1 µm, a vacuum atmosphere is set to 101 kPa (760 mmHg), a pressing temperature is set to 270° C., a pressing pressure is set to 3.04 MPa (30 kgf/cm$^2$), and a pressing time is set to 90 minutes.

The phosphor layer 112 of the columnar crystal made of CsI:Tl is formed onto the surface of the moisture-proof metal foil 114b having the mirror surface properties of the molded supporting member 118 by the evaporation depositing method. The moisture resistant protective layer 113 comprising the organic film made of polyparaxylylene is formed onto the whole surface of the formed phosphor layer 112 and supporting member 118 by the CVD method, thereby obtaining the scintillator panel 110.

The surface of the obtained scintillator panel 110 on the side where the phosphor layer 112 has been formed is adhered to the photodetector 100 via the adhesive layer 121, thereby manufacturing the radiation detecting apparatus.

The radiation detecting apparatus manufactured as mentioned above is held in a testing chamber of a temperature and a humidity of 60° C. and 90% for 1000 hours. Thus, a positional deviation of the phosphor layer 112 and a defective appearance such as peel-off between the layers or the like do not occur. Further, a deterioration in reflecting characteristics due to corrosion of the moisture-proof metal foil 114b as a reflective layer is not detected at all. The radiation detecting apparatus of high reliability was obtained.

Example 2

The photodetector 100 is manufactured in a manner similar to Example 1.

The phosphor layer 112 of the columnar crystal made of CsI:Tl is formed onto the surface of the moisture-proof metal foil 114b of the molded supporting member 118 in a manner similar to Example 1. After that, the top face and the side surfaces of the phosphor layer 112 and the surfaces and the edge surfaces other than the region where the phosphor layer 112 is formed on the side of the supporting member 118 where the phosphor layer 112 is formed excluding the moisture-proof metal foil 114a on which the phosphor layer 112 is not formed are coated with the moisture resistant protective layer 113 comprising the organic film made of polyparaxylylene by the CVD method, thereby obtaining the scintillator panel 110.

The obtained scintillator panel 110 is adhered to the photodetector 100 in a manner similar to Example 1, thereby obtaining the radiation detecting apparatus.

The radiation detecting apparatus manufactured as mentioned above is held in the testing chamber of a temperature and a humidity of 60° C. and 90% for 1000 hours. Thus, a positional deviation of the phosphor layer 112 and a defective appearance such as peel-off between the layers or the like do not occur. Further, a deterioration in reflecting characteristics due to corrosion of the moisture-proof metal foil 114b as a reflective layer is not detected at all. The radiation detecting apparatus of high reliability was obtained.

Comparison Example 1

The photodetector 100 is manufactured in a manner similar to Example 1.

Subsequently, an Al layer having a thickness of 5000 Å is formed as a metal reflective layer 214 by a sputtering method onto the surface of an amorphous carbon substrate having a substrate surface area of 450 mm×450 mm and a thickness of 1 mm as a supporting substrate 211. The phosphor layer 112 of the columnar crystal and the moisture resistant protective layer 113 are formed onto the formed Al layer in a manner similar to Example 1, thereby obtaining the scintillator panel 210 (refer to FIG. 7).

A radiation detecting apparatus is obtained by adhering the obtained scintillator panel 210 to the photodetector 100 in a manner similar to Example 1.

The radiation detecting apparatus manufactured as mentioned above is held in the testing chamber of a temperature and a humidity of 60° C. and 90% for 1000 hours. After that, whether defects due to a peel-off between the layers, breakage of the metal reflective layer, and the corrosion of the metal reflective layer exist on an image or not is observed. Thus, a number of pixel defects which are assumed to be caused by the corrosion of the Al layer as a metal reflective layer 214 occurred.

Comparison Example 2

The photodetector 100 is manufactured in a manner similar to Example 1.

After the metal reflective layer 214 is formed on the supporting substrate 211 in a manner similar to Comparison Example 1, an SiNx film having a thickness of 300 nm is further formed by the sputtering method as a protective layer which covers the metal reflective layer 214. The phosphor layer 112 of the columnar crystal and the moisture resistant protective layer 113 are formed on the formed SiNx film in a manner similar to Example 1, thereby obtaining a scintillator panel.

A radiation detecting apparatus is obtained by adhering the obtained scintillator panel to the photodetector 100 in a manner similar to Example 1.

The radiation detecting apparatus manufactured as mentioned above is held in the testing chamber of a temperature and a humidity of 60° C. and 90% for 1000 hours. After that, whether defects due to a peel-off between the layers, breakage of the metal reflective layer, and the corrosion of the metal reflective layer exist on an image or not is observed.

Thus, a number of pixel defects which are assumed to be caused by the corrosion of the Al layer as a metal reflective layer 214 occurred.

The following effects are obtained by the scintillator panel and the radiation detecting apparatus according to the invention as described above.

By using the supporting substrate having the radiation permeability formed by laminating the non-conductive layers 115 as layers for assuring the non-conductivity of the surfaces and the rigidity holding layer 116 as a layer for holding the rigidity of the substrate, it is possible to form the scintillator panel in which the deformation of the supporting substrate is prevented, the phosphor layer formed on the supporting substrate can be precisely formed with a desired thickness, there is no variation in thickness of the phosphor layer, a fluctuation in light absorption of the phosphor layer is reduced, and uniformity is high. Further, the deformation due to the electrochemical corrosion of the metal reflective layer can be prevented and the attenuation of the reflecting characteristics of the metal reflective layer can be prevented.

By using the resin which holds the rigidity as a rigidity holding layer 116 and using the precursors of the resin which holds the rigidity as non-conductive layers 115, the rigidity of the supporting substrate 111 is improved and the adhesion between the layers is improved, so that the durability of the supporting substrate 111 is improved.

By forming the moisture-proof metal foils 114a and 114b onto the surface of the supporting substrate 111 where the phosphor layer is provided and the opposite surface which faces such a surface, it is possible to obtain the supporting member 118 having the surface on the side where the phosphor layer having the light reflecting effect is formed and the opposite surface which has a moisture-proof effect, a light shielding effect, and a magnetic shielding effect and faces the surface on the side where the phosphor layer is formed. In the scintillator panel using the supporting member 118, since there is no need to separately provide the metal reflective layer onto the surface of the supporting member 118 on the side where the phosphor layer is formed and provide the moisture-proof protective layer and the magnetic shield onto the opposite surface, the low-cost scintillator panel for the radiation detecting apparatus can be realized.

When the radiation detecting apparatus is constructed by using the scintillator panel of the invention, by constructing the scintillator panel by using the supporting member 118 having the moisture-proof metal foils 114a and 114b onto both surfaces of the supporting substrate 111, the rigidity of the scintillator panel is further improved, such a stress that forces a warp is not applied to the scintillator panel, a peel-off and breakage of the phosphor layer do not occur, and particularly, the moisture resistant and the durability are improved.

Further, in the manufacturing method of the scintillator panel in the invention, since the supporting substrate of the scintillator panel is molded by the batch pressing operation, there is no need to newly provide the protective layers and the reflective layer, the number of manufacturing steps is reduced, and the low-cost scintillator panel for the radiation detecting apparatus can be realized.

Moreover, no warp occurs in the scintillator panel during the manufacturing steps and the prevention of the occurrence of defective positional precision due to the warp can be realized in the adhering step, the connecting step of electric installation parts, and the assembling step.

As many apparently widely different embodiments of the present invention can be made without departing from the spirit and scope thereof, it is to be understood that the invention is not limited to the specific embodiments thereof except as defined in the claims.

What is claimed is:

1. A scintillator panel comprising:
   a phosphor layer for converting a radiation into light; and
   a supporting member having a supporting substrate having radiation transmittable for supporting said phosphor layer,
   wherein said supporting substrate is formed by laminating non-conductive layers for assuring non-conductivity of a surface which supports said phosphor layer of said supporting substrate and non-conductivity of an opposite surface which faces said surface and a rigidity holding layer for assuring rigidity of said supporting substrate.

2. A panel according to claim 1, wherein said supporting member is formed by further laminating moisture-proof metal foils onto said surface and said opposite surface of said supporting substrate.

3. A panel according to claim 2, wherein a thickness of said moisture-proof metal foil lies within a range from 10 to 100 µm.

4. A panel according to claim 1, wherein said rigidity holding layer is made of a resin which holds the rigidity and said non-conductive layer is formed by a precursor of the resin which holds the rigidity.

5. A panel according to claim 4, wherein said resin is made of an aromatic polyimide resin and said precursor is made of an aromatic polyimide precursor.

6. A panel according to claim 1, wherein said supporting substrate is formed by laminating a plurality of said non-conductive layers and a plurality of said rigidity holding layers.

7. A panel according to claim 1, further comprising a moisture preventing protective layer which covers said phosphor layer and said supporting member.

8. A radiation detecting apparatus comprising:
   the scintillator panel according to claim 1; and
   a sensor panel including a plurality of photoelectric converting elements which are two-dimensionally arranged and convert the light converted in said phosphor layer into electric signals.

9. A radiation detection system including the radiation detecting apparatus according to claim 8.

* * * * *